(12) United States Patent
Hache (10) Patent No.: US 6,604,922 B1
(45) Date of Patent: Aug. 12, 2003

(54) OPTIMIZED FIBER REINFORCED LINER MATERIAL FOR POSITIVE DISPLACEMENT DRILLING MOTORS

(75) Inventor: Jean-Michel Hache, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/097,480

(22) Filed: Mar. 14, 2002

(51) Int. Cl.⁷ ............................................. F03C 2/08
(52) U.S. Cl. ...................... 418/48; 418/153; 418/178
(58) Field of Search ........................ 418/48, 153, 178

(56) References Cited

U.S. PATENT DOCUMENTS

| | | | |
|---|---|---|---|
| 3,417,664 A | 12/1968 | Brucker | 418/152 |
| 4,104,009 A | 8/1978 | Chanton | 418/48 |
| 4,173,670 A | 11/1979 | VanAuken | 428/36 |
| 4,676,725 A | 6/1987 | Eppink | 418/48 |
| 4,836,759 A | 6/1989 | Lloyd | 418/56 |
| 5,145,343 A | 9/1992 | Belcher | 418/48 |
| 5,171,138 A | 12/1992 | Forrest | 418/48 |
| 5,318,416 A | 6/1994 | Hantschk et al. | 418/48 |
| 5,358,390 A | 10/1994 | Jäger | 418/48 |
| 5,759,019 A | 6/1998 | Wood et al. | 418/48 |
| 5,975,260 A | 11/1999 | Fischer et al. | 192/3.29 |
| 6,019,583 A | 2/2000 | Wood | 418/48 |
| 6,035,899 A | 3/2000 | Ohkoshi et al. | 138/123 |
| 6,102,681 A | 8/2000 | Turner | 418/48 |
| 6,120,267 A | 9/2000 | Cunningham | 418/48 |
| 6,158,988 A | 12/2000 | Jager | 418/48 |
| 6,162,032 A | 12/2000 | Jager | 418/48 |
| 6,183,226 B1 | 2/2001 | Wood et al. | 418/48 |
| 6,293,358 B1 | 9/2001 | Jäger | 418/48 |
| 6,309,195 B1 | 10/2001 | Bottos et al. | 418/48 |
| 2001/0005486 A1 | 6/2001 | Wood | 418/48 |

FOREIGN PATENT DOCUMENTS

| | | | |
|---|---|---|---|
| DE | 2713468 | * 9/1978 | 418/153 |
| WO | WO 97/40273 | 10/1997 | |
| WO | WO 99/31389 | 6/1999 | |
| WO | WO 99/63226 | 12/1999 | |

* cited by examiner

Primary Examiner—John J. Vrablik
(74) Attorney, Agent, or Firm—Jennie (JL) Salazar; Brigitte L. Jeffery; John J. Ryberg (57) ABSTRACT

A method of forming a stator for a positive displacement motor. The method includes forming a liner that includes at least two resilient layers and at least one fiber layer, and the at least two resilient layers are positioned so as to enclose the at least one fiber layer. The liner is positioned in a stator tube, and the stator tube includes a shaped inner surface including at least two radially inwardly projecting lobes extending helically along a selected length of the stator tube. The liner is cured in the stator tube so that the liner conforms to the radially inwardly projecting lobes formed on the inner surface and to the helical shape of the inner surface. The curing forms a bond between the liner and the inner surface and between the at least two resilient layers and the at least one fiber layer.

50 Claims, 6 Drawing Sheets

OPTIMIZED FIBER REINFORCED LINER MATERIAL FOR POSITIVE DISPLACEMENT DRILLING MOTORS

BACKGROUND OF INVENTION

1. Field of the Invention

The invention relates generally to stators used with positive displacement drilling motors. More specifically, the invention relates to a fiber reinforced liner adapted for use with formed stators.

2. Background Art

Positive Displacement Motors (PDMs) are known in the art and are commonly used to drill wells in earth formations. PDMs operate according to a reverse mechanical application of the Moineau principle wherein pressurized fluid is forced though a series of channels formed on a rotor and a stator. The channels are generally helical in shape and may extend the entire length of the rotor and stator. The passage of the pressurized fluid generally causes the rotor to rotate within the stator. For example, a substantially continuous seal may be formed between the rotor and the stator, and the pressurized fluid may act against the rotor proximate the sealing surfaces so as to impart rotational motion on the rotor as the pressurized fluid passes through the helical channels.

Figure 1:
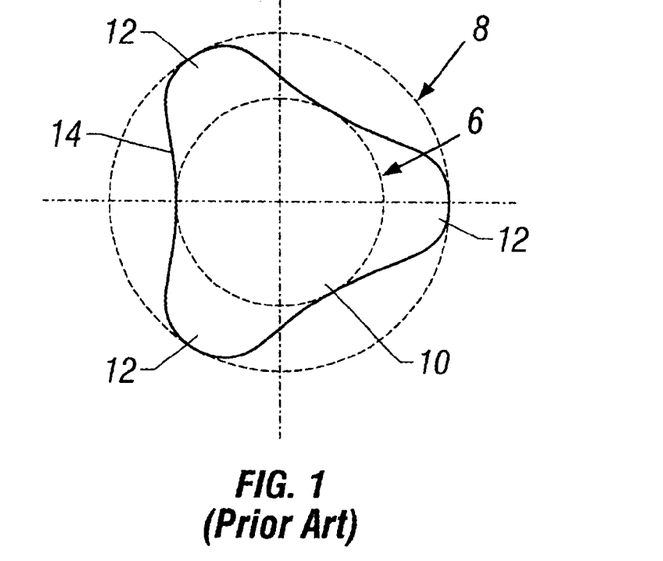
FIG. 1 shows a cross-sectional view of a prior art rotor.
Figure 2:
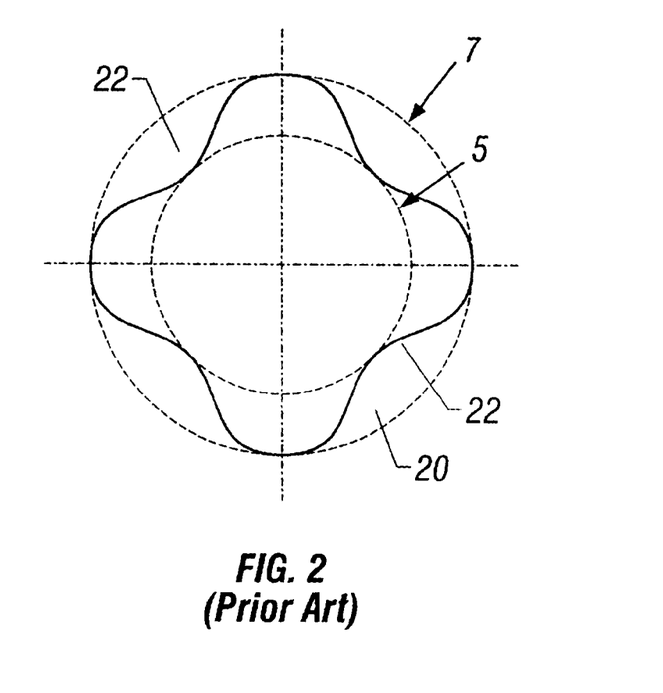
FIG. 2 shows a cross-sectional view of a prior art stator.
Figure 3:
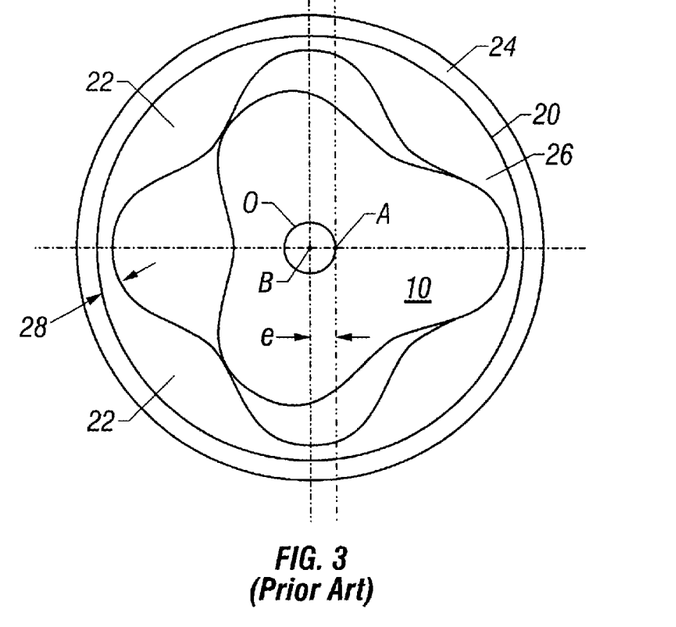
FIG. 3 shows a cross-sectional view of an assembled positive displacement motor.

Referring to FIG. 1, a typical rotor 10 includes at least one lobe 12 (wherein, for example, channels 14 are formed between lobes 12), a major diameter 8, and a minor diameter 6. The rotor 10 may be formed of metal or any other suitable material. The rotor 10 may also be coated to withstand harsh drilling environments experienced downhole. Referring to FIG. 2, a typical stator 20 comprises at least two lobes 22, a major diameter 7, and a minor diameter 5. Note that if the rotor (10 in FIG. 1) includes "n" lobes, the corresponding stator 20 used in combination with the rotor 10 generally includes either "n+1" or "n−1" lobes. Referring to FIG. 3, the stator 20 generally includes a cylindrical external tube 24 and a liner 26. The liner 26 may be formed from an elastomer, plastic, or other synthetic or natural material known in the art. The liner 26 is typically injected into the cylindrical external tube 24 around a mold (not shown) that has been placed therein. The liner 26 is then cured for a selected time at a selected temperature (or temperatures) before the mold (not shown) is removed. A thickness 28 of the liner 26 is generally controlled by changing the dimensions of the mold (not shown).

A lower end of the rotor may be coupled either directly or indirectly to, for example, a drill bit. In this manner, the PDM provides a drive mechanism for a drill bit independent of any rotational motion of a drillstring generated proximate the surface of the well by, for example, rotation of a rotary table on a drilling rig. Accordingly, PDMs are especially useful in drilling directional wells where a drill bit is connected to a lower end of a bottom hole assembly (BHA). The BHA may include, for example, a PDM, a transmission assembly, a bent housing assembly, a bearing section, and the drill bit. The rotor may transmit torque to the drill bit via a drive shaft or a series of drive shafts that are operatively coupled to the rotor and to the drill bit. Therefore, when directionally drilling a wellbore, the drilling action is typically referred to as "sliding" because the drill string slides through the wellbore rather than rotating through the wellbore (as would be the case if the drill string were rotated using a rotary table) because rotary motion of the drill bit is produced by the PDM. However, directional drilling may also be performed by rotating the drill string and using the PDM, thereby increasing the available torque and drill bit rpm.

A rotational frequency and, for example, an amount of torque generated by the rotation of the rotor within the stator may be selected by determining a number of lobes on the rotor and stator, a major and minor diameter of the rotor and stator, and the like. An assembled view of a rotor and a stator is shown in FIG. 3. Rotation of the rotor 10 within the stator 20 causes the rotor 10 to nutate within the stator 20. Typically, a single nutation may be defined as when the rotor 10 moves one lobe width within the stator 20. The motion of the rotor 10 within the stator 20 may be defined by a circle 0 which defines a trajectory of a point A disposed on a rotor axis as point A moves around a stator axis B during a series of nutations. Note that an "eccentricity" e of the assembly may be defined as a distance between the rotor axis A and the stator axis B when the rotor 10 and stator 20 are assembled to form a PDM.

Typical stators known in the art are formed in a manner similar to that shown in FIG. 2. Specifically, an inner surface 29 of the external tube 24 is generally cylindrical in shape and the stator lobes 22 are formed by molding an elastomer in the external tube 24. Problems may be encountered with the stator 20 when, for example, rotation of the rotor 10 within the stator 20 shears off portions of the stator lobes 22. This process, which may be referred to as "chunking," deteriorates the seal formed between the rotor 10 and stator 20 and may cause failure of the PDM. Chunking may be increased by swelling of the liner 26 or thermal fatigue. Swelling and thermal fatigue may be caused by elevated temperatures and exposure to certain drilling fluids and formation fluids, among other factors. Moreover, flexibility of the liner 26 may lead to incomplete sealing between the rotor 10 and stator 20 such that available torque may be lost when the rotor compresses the stator lobe material, thereby reducing the power output of the PDM. Accordingly, there is a need for a stator design that provides increased power output and increased longevity in harsh downhole environments.

Prior attempts have been made to increase stator durability and heat conduction properties. U.S. Pat. No. 6,201,681, issued to Turner, describes fibers disposed in an elastomer material that forms a stator for a helicoidal pump or motor. The fibers are generally arranged to form a two or three dimensional structure within the elastomer material. The fibers are either coated with the elastomer material as they are being woven to form a fabric layer or are formed into the desired arrangement to form a fiber skeleton. After the fiber skeleton is formed, elastomer is then injected into the stator under heat and pressure to complete the process.

However, fiber reinforcement has presented manufacturing difficulties because it is difficult to achieve a desired fiber arrangement using injection molding techniques. Fiber reinforcement via injection molding requires additional manufacturing steps, and the manufacturing processes generally produce either a different concentration of fibers per unit volume of elastomer between the thick portions of the lobes and the thin portions (which reduces the mechanical strength of the liner) or, when fibers are disposed manually, a different number of layers must be applied in the thick portions of the lobes as compared to the thin portions.

Accordingly, there is a need for a liner material that is more durable and is able to withstand prolonged sealing engagement between a rotor and a stator in harsh operating conditions. Moreover, there is a need for a new liner material that is adapted for use with stators that include contoured inner surfaces formed on the stator tube. The liner material should be durable and should be less susceptible to wear and, for example, thermal fatigue. The liner material should also be easy to install so as to achieve a desired fiber concentration proximate selected regions of the rotor or stator.

SUMMARY OF INVENTION

In one aspect, the invention comprises a method of forming a stator for a positive displacement motor. The method comprises forming a liner including at least two resilient layers and at least one fiber layer. The at least two resilient layers are positioned so as to enclose the at least one fiber layer. The liner is positioned in a stator tube, and the stator tube comprises a shaped inner surface including at least two radially inwardly projecting lobes extending helically along a selected length of the stator tube. The liner is cured in the stator tube so that the liner conforms to the radially inwardly projecting lobes formed on the inner surface and to the helical shape of the inner surface. The curing is adapted to form a bond between the liner and the inner surface and between the at least two resilient layers and the at least one fiber layer.

In another aspect, the invention comprises a stator for a positive displacement motor. The stator comprises a stator tube and a liner. The stator tube comprises a shaped inner surface including at least two radially inwardly projecting lobes extending helically along a selected length of the stator tube. The liner comprises at least two resilient layers and at least one fiber layer, and the at least two resilient layers are positioned so as to enclose the at least one fiber layer. The liner is disposed in the stator tube proximate the inner surface, and the liner conforms to the radially inwardly projecting lobes formed on the inner surface and to the helical shape of the inner surface.

In another aspect, the invention comprises a positive displacement motor including a stator comprising a shaped inner surface. The inner surface comprises at least two radially inwardly projecting lobes extending helically along a selected length of the stator. A liner comprising at least two resilient layers and at least one fiber layer is disposed within the stator so that the liner conforms to the helical shape formed by the at least two radially inwardly projecting lobes. The at least two resilient layers are positioned so as to enclose the at least one fiber layer. A rotor comprises at least one radially outwardly projecting lobe extending helically along a selected length of the rotor. The rotor is disposed inside of the stator and the at least one radially outwardly projecting lobe formed on the rotor is adapted to sealingly engage the at least two radially inwardly projecting lobes formed when the liner conforms to the inner surface of the stator.

In another aspect, the invention comprises a method of forming a rotor for a positive displacement motor. The method comprises forming a liner on a rotor by layering at least two resilient layers and at least one fiber layer on an outer surface of the rotor. The at least two resilient layers are positioned so as to enclose the at least one fiber layer, and the rotor comprises at least one radially outwardly projecting lobe extending helically along a selected length of the rotor. The liner is cured on the rotor so that the liner conforms to the at least one radially outwardly projecting lobe formed on the rotor and to the helical shape of the rotor, and the curing is adapted to form a bond between the liner and the outer surface and between the at least two resilient layers and the at least one fiber layer.

In another aspect, the invention comprises a rotor for a positive displacement motor. The rotor comprises at least one radially outwardly projecting lobe formed on an outer surface of the rotor and extending helically along a selected length of the rotor. A liner comprising at least two resilient layers and at least one fiber layer is disposed on the rotor proximate the outer surface. The at least two resilient layers positioned so as to enclose the at least one fiber layer, and the liner conforms to the at least one radially outwardly projecting lobe formed on the outer surface and to the helical shape of the rotor.

In another aspect, the invention comprises a positive displacement motor including a stator comprising a shaped inner surface. The inner surface comprises at least two radially inwardly projecting lobes extending helically along a selected length of the stator. A rotor comprises at least one radially outwardly projecting lobe formed on an outer surface of the rotor and extending helically along a selected length of the rotor. A liner comprising at least two resilient layers and at least one fiber layer is disposed on the external surface so that the liner conforms to the helical shape formed by the at least one radially outwardly projecting lobe. The at least two resilient layers are positioned so as to enclose the at least one fiber layer. The rotor is disposed inside of the stator and the at least one radially outwardly projecting lobe formed when the liner conforms to the outer surface of he rotor is adapted to sealingly engage the at least two radially inwardly projecting lobes formed on the stator.

Other aspects and advantages of the invention will be apparent from the following description and the appended claims.

DETAILED DESCRIPTION

Figure 4:
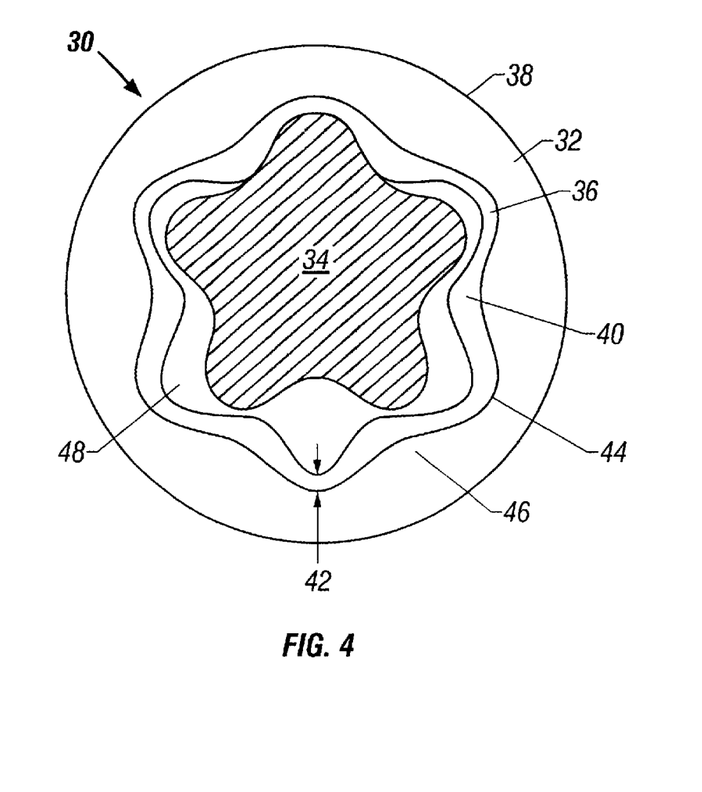
FIG. 4 shows a cross-sectional view of an embodiment of the invention.

FIG. 4 shows an embodiment comprising at least one aspect of the present invention. A positive displacement motor (PDM) 30 comprises a stator 32 and a rotor 34. The stator 32 comprises an external tube 38 that may be formed from, for example, steel or another material suitable for downhole use in a drilling environment. The stator also comprises a liner 36.

The external tube 38 comprises a shaped inner surface 44 that comprises at least two lobes 46 formed thereon. The lobes 46 are helically formed along a selected length of the external tube 38 so that the lobes 46 define a helical pattern along the selected length. The helical form of the inner surface 44 generally corresponds to a desired shape for stator lobes. The liner 36 typically comprises at least two lobes 40, and a thickness 42 of the liner 36 may be either uniform or non-uniform throughout a cross-section thereof. Accordingly, the embodiments shown herein comprising a non-uniform cross-section are intended to clarify the invention and should not be interpreted as limiting the scope of the invention to a non-uniform cross-section. The lobes 40 (and the liner 36) are helically formed along a selected length of the external tube 38 such that the liner 36 conforms to the helically shaped inner surface 44 so that the at least two lobes 46 formed on the shaped inner surface 44 correspond to the lobes 40 formed in the liner 36. The external tube 38, including the inner surface 44, may be helically shaped by any means known in the art including machining, hydroforming, extrusion, and the like. Shaping of the inner surface 44 of the external tube 38 is described in co-pending U.S. patent application Ser. No. 10/056,135 filed on Jan. 24, 2002, and assigned to the assignee of the present application.

In some embodiments, the shaped inner surface 44 of the external tube 38 is adapted to provide additional support for the liner material. The shaped inner surface 44 "stiffens" the liner 36 by providing support for the liner 36 (e.g., by forming a metal backing), thereby increasing power available from the PDM. For example, shaping the inner surface 44 to form a contoured backing for the liner 36 may stiffen the liner material proximate the lobes 40 by reducing an amount by which the liner 36 may be compressed when contacted by the rotor 44 so that a better seal may be formed between the rotor 44 and the stator 32. Moreover, reduced flexibility increases an amount of torque required to stall the PDM. The thickness 42 of the liner 36 is substantially uniform through a cross-section thereof. The shaped form of the inner surface 44 typically results in a thinner liner 36 than is commonly used in prior art stators (such as that shown in FIG. 2). Fluid pressure is less likely to deform the liner 36, and, accordingly, the liner 36 is less susceptible to deformation that could reduce the efficiency of the seal formed between the rotor 34 and stator 32 (thereby producing an additional loss in power output of the PDM 30).

The liner 36 may be formed from different materials, including but not limited to resilient materials such as elastomers, polymers, and other synthetic or natural materials known in the art. A preferred embodiment comprises a liner 36 formed from a fiber reinforced elastomer material. However, while a preferred embodiment comprises an elastomer material as the resilient material, any suitable resilient material known in the art may be used within the scope of the invention. Accordingly, descriptions of embodiments contained herein that refer to elastomer materials are not intended to be limiting with respect to the type of resilient material.

Figures 5, 6:
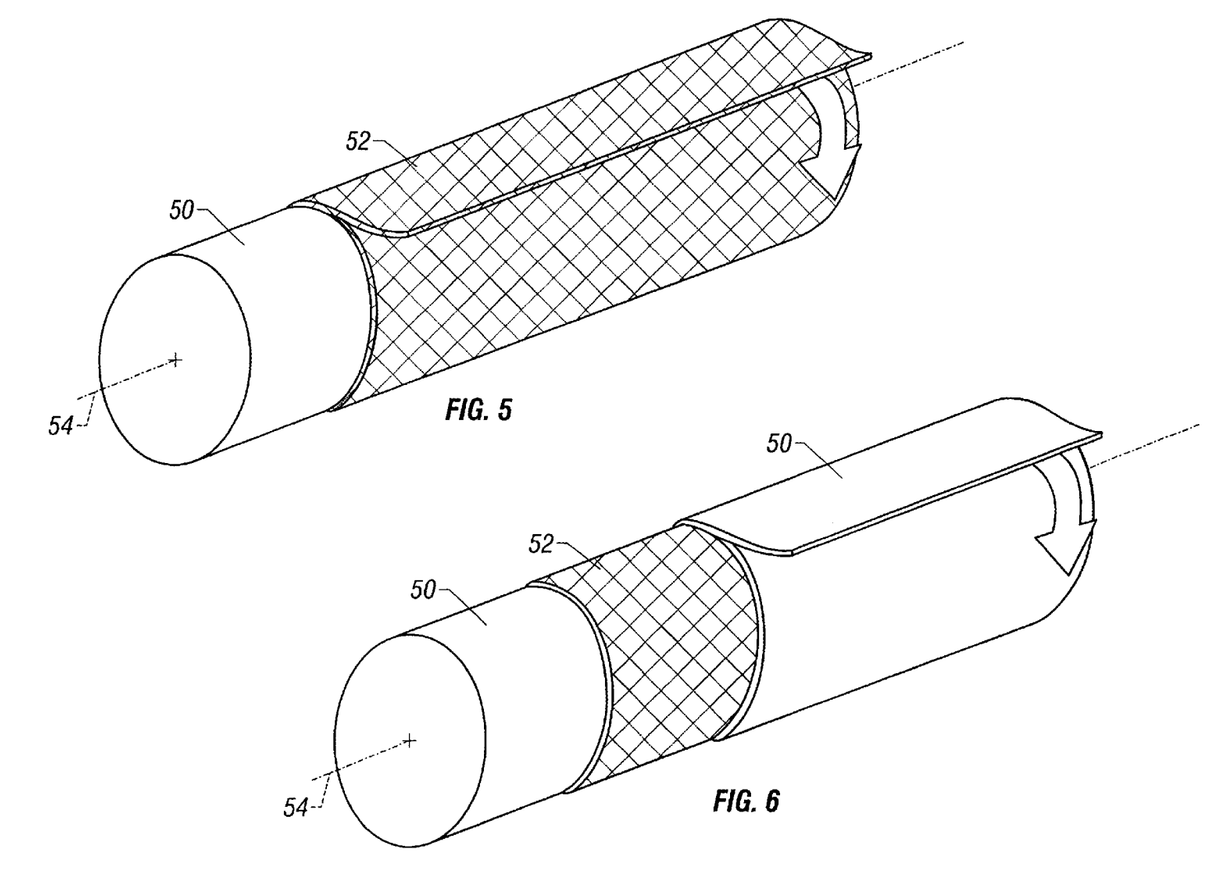
FIG. 5 shows a perspective view of an embodiment of the invention.
FIG. 6 shows a perspective view of an embodiment of the invention.

FIGS. 5–8 show an example of a method by which a fiber reinforced liner for a stator may be formed. As shown in FIGS. 5 and 6, alternating layers of a resilient material, such as an elastomer material, and a woven fiber material may be overlaid so as to form a composite structure. Note that some embodiments may include wrapping successive layers over a core or mandrel. However, a mandrel is not necessary to form the liner. For example, a first layer comprising an elastomer material 50 (or, for example, an elastomer tube) may be wrapped with a second layer comprising a fiber layer 52, which in some embodiments may comprise a woven fiber mesh. In some embodiments, the fiber layer 52 may comprise aramid fibers such as those sold under the mark "Kevlar" (a mark of E.I. Dupont de Nemours of Wilmington, Del.), wherein the Kevlar fibers are wound at selected angles with respect to, for example, a longitudinal axis 54 of the liner (e.g., a longitudinal axis of the stator).

Other embodiments may comprise glass, carbon, or any other type of suitable fiber known in the art. Moreover, the fibers used to reinforce the elastomer material 50 in a preferred embodiment are generally not impregnated with a resin or other polymeric material, but it is within the scope of the present invention to use impregnated materials. The fibers may also be wound directly onto the elastomer materials using means known in the art, and use of a pre-woven cloth is not intended to limit the scope of the invention.

Figure 9:
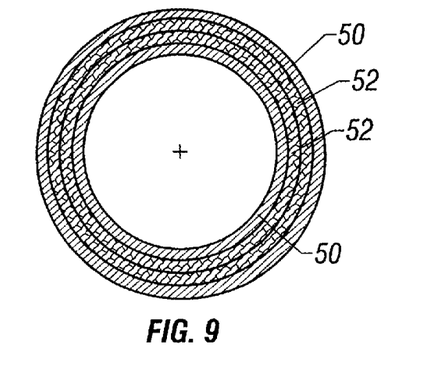
FIG. 9 shows a cross-sectional view of an embodiment of the invention.

Embodiments of the invention may comprise any number of layers and arrangements of elastomer and fiber reinforcing materials. FIG. 6 shows an embodiment comprising a fiber reinforcing layer 52 disposed between two elastomer layers 50. However, a plurality of fiber reinforcing layers 52 may be used so as to, for example, increase a stiffness and/or wear resistance of the liner. Moreover, the invention is not limited to the layering techniques shown in FIGS. 2 and 3. For example, FIG. 9 shows an embodiment comprising adjacent fiber layers 52 enclosed within elastomer layers 50. This layering technique may be used to, for example, increase fiber density. Additionally, a plurality of elastomer layers may be used to form the liner. A preferred embodiment comprises a plurality of consecutively layered elastomer and fiber materials.

Fibers in the reinforcing layers may be wound at any angle with respect to the longitudinal axis of the stator. In some embodiments, the fibers may be woven into a mesh, braided, or overlaid. For example, a plurality of fibers may be woven together with approximately half of the fibers wound at an angle of +45 degrees and approximately half of the fibers wound at an angle of −45 degrees. Moreover, adjacent fiber layers may be wound at similar or different angles so that, for example, one fiber layer provides circumferential support (e.g., a radially wound layer) and another fiber layer provides increased bending stiffness (e.g., a longitudinally wound layer).

Figure 10:
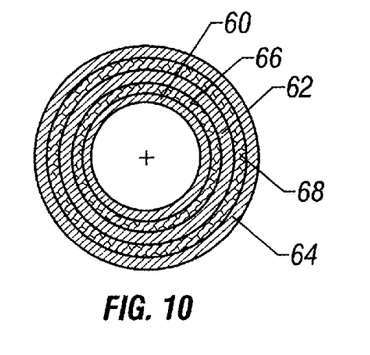
FIG. 10 shows a cross-sectional view of an embodiment of the invention.

In some embodiments, different elastomers and different fiber materials may be used in consecutive layers. Referring to FIG. 10, some embodiments may comprise first 60, second 62, and third 64 elastomer layers enclosing first 66 and second 68 fiber layers. In some embodiments, the elastomer layers 60, 62, 64 may comprises the same material while the first 66 and second 68 fiber layers are formed from Kevlar and glass fibers, respectively. Alternatively, different elastomer materials may be used to form the different elastomer layers 60, 62, 64. Additional fiber layers may be included to, for example, form external layers that enclose the elastomer layers. Any combination of materials may be used to form the layers, and the example shown in FIG. 10 is not intended to limit the scope of the invention.

Figure 11:
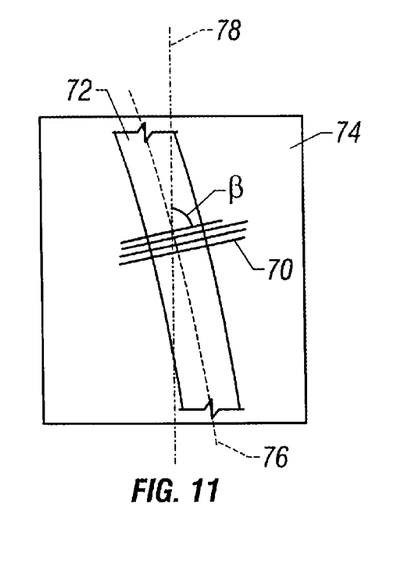
FIG. 11 shows a cross-sectional view of an embodiment of the invention.

In other embodiments such as the embodiment shown in FIG. 11, a wind angle β of selected fibers 70 may be oriented relative to lobes 72 formed on a liner 74 and shaped inner surface (not shown separately in FIG. 11) of the stator (not shown separately in FIG. 11). Note that FIG. 11 shows a planar projection of a section of the liner 74 and includes a stator axis 78 as a reference. For example, contact between the rotor and the stator generally occurs in a plane 76 (e.g., a "contact plane") that is generally defined as a function of the helical shape of the rotor and the stator. Accordingly, the fibers 70 may be wound (or a pre-woven cloth positioned) so that the fibers 70 lay at a selected angle β with respect to the contact plane 76. In this manner, the fibers 70 may be positioned so as to improve the wear and performance properties of the lobes 72 in the region proximate the seal formed between the rotor and the stator. Note that the fibers 70 are shown as being positioned substantially perpendicular to the contact plane 76. This arrangement is shown to clarify the invention and is not intended to be limiting.

Figure 7:
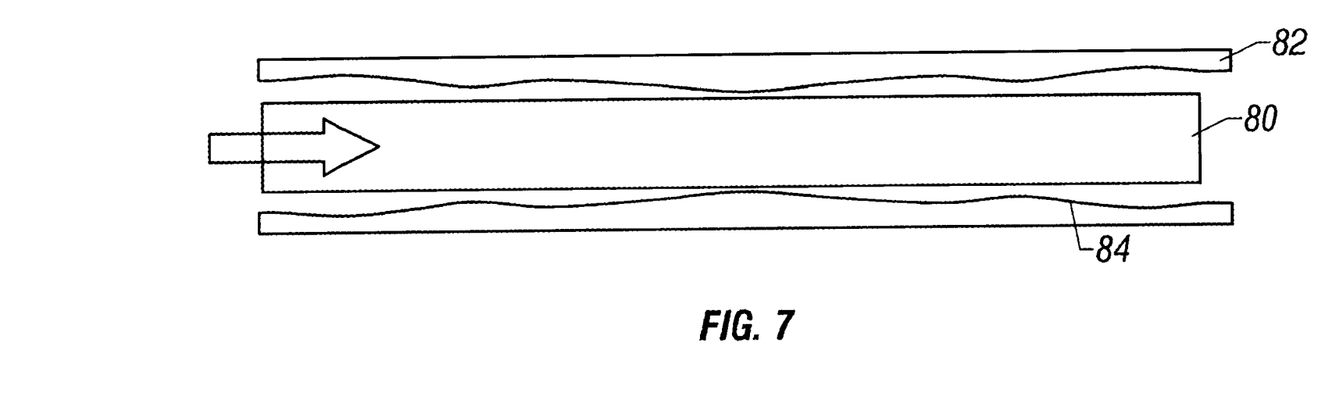
FIG. 7 shows a cross-sectional view of an embodiment of the invention.
Figure 8:
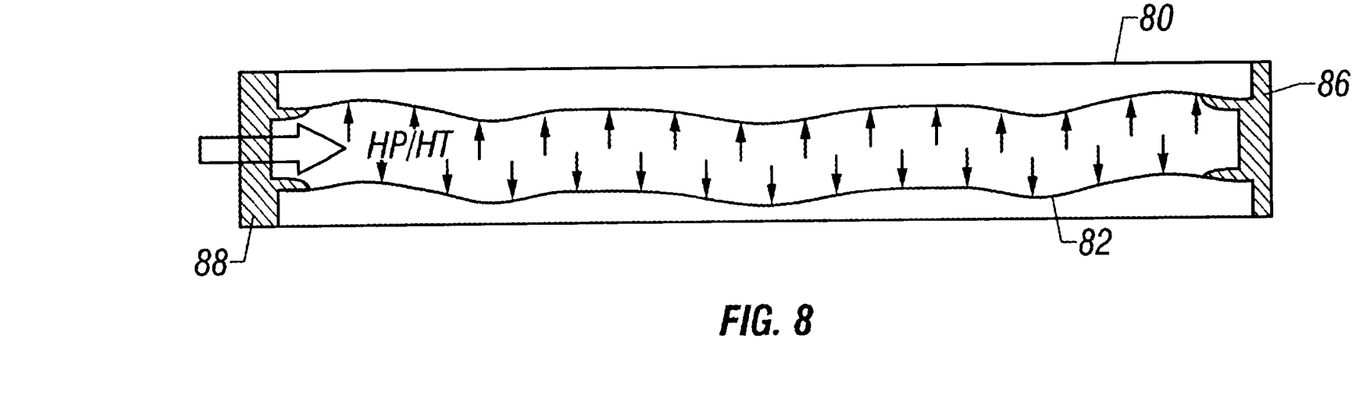
FIG. 8 shows a cross-sectional view of an embodiment of the invention.

Referring to FIG. 7, after the layering process has been completed, a substantially cylindrical liner 80 may be inserted into a stator 82 comprising a shaped inner surface 84 as described above. Referring to FIG. 8, ends of the stator 82 may then be sealed (using, for example, end pieces 86, 88) and the liner 80 may be cured by applying high pressure and high temperature to the interior of the liner 80 so as to expand the liner 80 within the stator 82 so that the liner 80 may conform to the shaped inner surface 84. A curing pressure, temperature, and time may be selected using means know in the art so as to completely cure the elastomer. After completion of the curing process, the stator will be returned to normal atmospheric conditions. Final machining may be required to complete the stator (e.g., ends of the liner 80 may need to be trimmed, ends of the stator 82 may be threaded, etc.).

During the curing process, the elastomer will typically plastically deform and conform to the shaped inner surface of the stator. Moreover, the elastomer may be selected so that, for example, the elastomer material "flows" to locally encapsulate the fiber layers and, in some embodiments, the individual fibers. The fiber layers may be wound or positioned in a manner that allows the fiber layers to unwrap or expand so as to conform to the expansion of the elastomer material. Note that an adhesive material may also be used to bond the liner to the inner surface. However, the type of elastomer may be selected so that an adhesive is not required. If an adhesive is required, any suitable adhesive known in the art may be used in the curing process.

Figure 12:
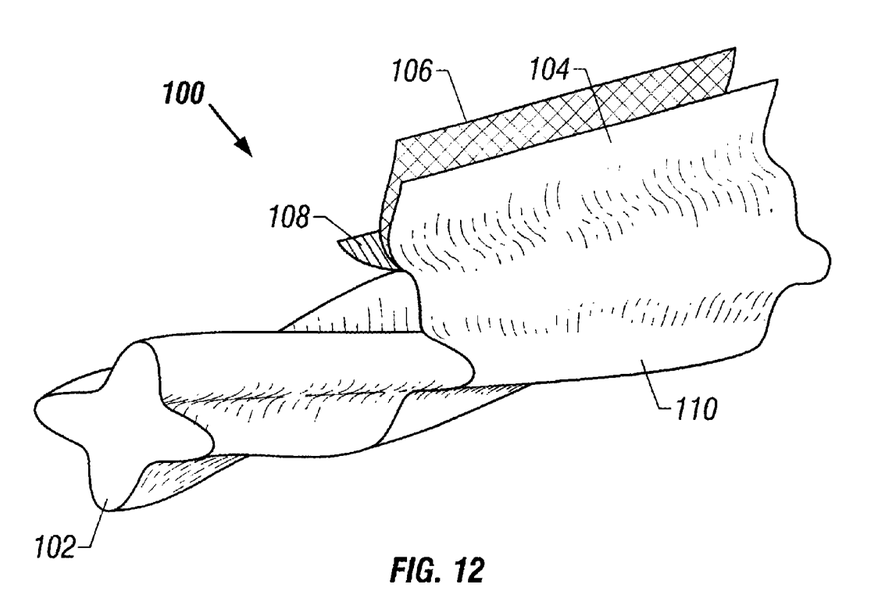
FIG. 12 shows a perspective view of an embodiment of the invention.

Another embodiment comprising at least one aspect of the present invention is shown in FIG. 12. A lined rotor 100 may be formed by consecutively layering elastomer layers 104, 108 and fiber layers 106 over a rotor 102 to form a rotor liner 110. As described with respect to previous embodiments, a plurality of elastomer and fiber layers may be used to form the rotor liner 110, and the layers may be arranged in any manner to achieve, for example, a desired wear resistance, flexibility, stiffness, and the like. Moreover, the rotor liner 110 may be formed according to the other methods and embodiments disclosed herein such that the arrangement shown in FIG. 12 is not intended to be limiting. For example, the rotor liner 110 may comprise a substantially uniform or a nonuniform cross-section, and the elastomer and fiber layers may be formed according to the description of the previous embodiments.

After the rotor 102 has been coated with the fiber reinforced rotor liner 110, the rotor liner 110 may be cured by applying high temperature and high pressure in a manner similar to that described with respect to the embodiment shown in FIG. 7. The rotor liner 110 may be positioned on the rotor 102 before curing so that the rotor liner 110 substantially conforms to an outer surface 120 of the rotor 102. The rotor liner 110 may then be cured on the rotor 102 so that the fiber and elastomer layers conform to the shape of the rotor 102 and form a bond with each other and with the outer surface 120. This arrangement eliminates the need for an intermediate forming apparatus (e.g., a mandrel) and permits the fiber reinforced rotor liner 110 to be compression molded directly onto the outer surface 120 of the rotor 102 during the curing process.

Figure 13:
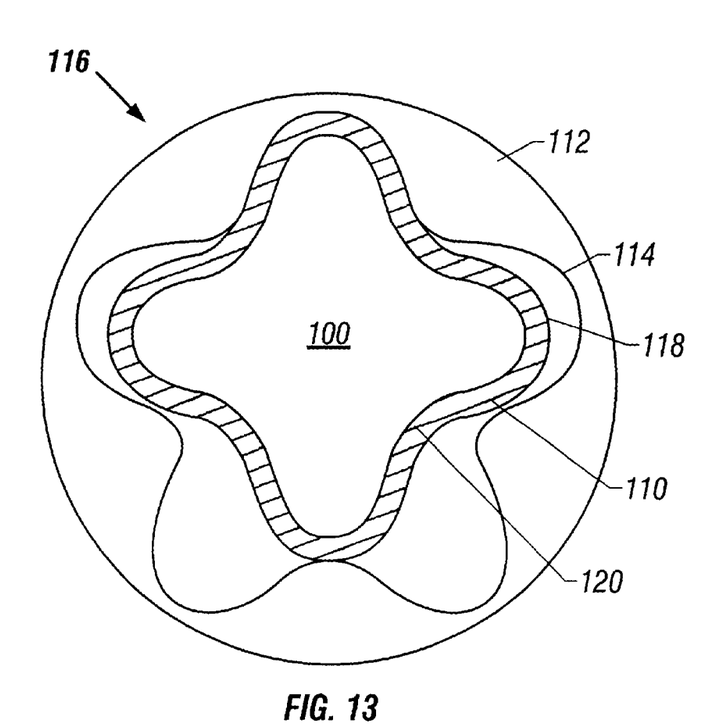
FIG. 13 shows a cross-sectional view of an embodiment of the invention.

After completion of the curing process, the lined rotor 100 may be returned to atmospheric conditions and machined as required to achieve a desired final configuration. Referring to FIG. 13, the lined rotor 100 is adapted for use with a stator 112 comprising a shaped, unlined inner surface 114. The operation of a positive displacement motor 116 formed by the lined rotor 100 and the shaped stator 112 is similar to that described with respect to previous embodiments. The lined rotor 100 nutates within the shaped stator 112, and the rotor liner 110 is compressed when lobes 118 formed on the lined rotor 100 contact the inner surface 114 of the shaped stator 112.

In a preferred embodiment of the invention, a fiber density is substantially uniform throughout the thickness of the liner. A uniform fiber density is advantageous because it helps achieve, for example, uniform wear resistance throughout the thickness of the liner. A uniform fiber density is particular desirable proximate the lobes because the lobes experience the highest mechanical and thermal stresses. Additional support and wear resistance proximate the lobes helps increase the longevity of the liner. Note that, in some embodiments, the liner thickness is at a maximum proximate the lobes, and a uniform fiber density supports and helps stiffen these regions so as to reduce deformation of the lobes caused by, for example, fluid pressure and contact with the rotor.

The stator and rotor forming processes described herein enable the formation of preferred embodiments (e.g., embodiments comprising liners having a substantially uniform fiber density) because the forming processes help ensure that a desired fiber arrangement is maintained (after the application of heat and pressure to cure the stator or rotor liner). Accordingly, the stator and rotor forming processes help avoid local and global deformation of fibers disposed in the liner such as that associated with elastomer injection around a set of prepositioned fibers in a stator tube.

Referring again to FIG. 4, the thickness 42 of the liner 36 may be selected to generate a desired amount of contact (or, if desired, clearance) between the liner 36 and the rotor 34. For example, the thickness 42 of the liner 36 may be selected to form a seal between the rotor 34 and the stator 32 while maintaining a desired level of compression between the rotor 34 and stator 32 when they are in contact with each other. Moreover, the thickness 42 of the liner 36 may be selected to permit, for example, swelling or contraction of the liner 36 caused by elevated temperatures, contact with drilling fluids and other fluids, and the like. Similar liner thickness selections may be made when forming a fiber reinforced rotor such as that shown in FIGS. 12 and 13.

Note that the embodiment shown in FIG. 4 is generally referred to as a "5:6" configuration including 5 lobes formed on the rotor and 6 lobes formed on the stator. Moreover, the embodiment shown in FIG. 13 is similarly referred to as a "4:5" configuration. Other embodiments may include any other rotor/stator combination known in the art, including 1:2, 3:4,.7:8, and other arrangements. Moreover, as described above, stators may generally be formed using "n+1" or "n−1" lobes, where "n" refers to a number of rotor lobes. Accordingly, the embodiments shown in FIGS. 4 and 13, and other embodiments described herein, are intended to clarify the invention and are not intended to limit the scope of the invention with respect to, for example, a number of or arrangement of lobes.

Advantageously, the invention comprises a stator or rotor comprising a durable liner comprising a fiber reinforced material. The fiber reinforced liner material may be used with conventional rotors and formed stators having a shaped inner surface, and the liner material may be adapted to form either a non-uniform or a substantially uniform liner thickness. The fiber density may be controlled so that it is substantially constant through a cross-section of the liner material (especially proximate lobes formed in liner having a non-uniform cross-section), and the liner material may be formed using industry standard manufacturing processes, such as calendaring, before being disposed in the stator or on the outer surface of the rotor.

The fiber reinforced liner material helps increase the longevity of the liner and, therefore, the stator or rotor by providing additional mechanical and thermal support through the liner but especially proximate the stator or rotor lobes. Increased longevity reduces a number of trips required to replace failed power sections when drilling wells in earth formation. Accordingly, fiber reinforced stators or rotors may significantly reduce the costs associated with drilling and exploration.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A stator for a positive displacement motor comprising:
   a stator tube, the stator tube comprising a shaped inner surface including at least two radially inwardly projecting lobes extending helically along a selected length of the stator tube; and
   a liner comprising at least two resilient layers and at least one fiber layer, the at least two resilient layers positioned so as to enclose the at least one fiber layer, wherein the liner is disposed in the stator tube proximate the inner surface, the liner conforming to the radially inwardly projecting lobes formed on the inner surface and to the helical shape of the inner surface.

2. The stator of claim 1, wherein a thickness of the liner is at a maximum proximate the at least two radially inwardly projecting lobes.

3. The stator of claim 1, wherein the at least one fiber layer comprises a plurality of fibers wound at a selected angle with respect to a longitudinal axis of the stator tube.

4. The stator of claim 1, wherein the at least one fiber layer comprises a plurality of fibers wound at a selected angle with respect to the at least two radially inwardly projecting lobes.

5. The stator of claim 1, wherein the at least one fiber layer comprises aramid fibers.

6. The stator of claim 1, wherein the at least one fiber layer comprises a plurality of fibers selected from the group) consisting of glass fibers and carbon fibers.

7. The stator or claim 1, wherein the at least one fiber layer comprises a woven fiber mesh.

8. The stator of claim 1, wherein the at least one fiber layer comprises a plurality of fibers wound directly onto at least one of the at least two resilient layers.

9. The stator of claim 1, wherein fibers forming the at least one fiber layer are braided.

10. The stator of claim 1, wherein fibers fonning the at least one fiber layer are woven.

11. The stator of claim 1, wherein the liner comprises an adhesive disposed on an external surface thereof, the adhesive adapted to bond the liner to the inner surface of the stator.

12. The stator of claim 1, wherein the at least one fiber layer is selectively positioned so as to form a substantially uniform fiber density throughout the liner.

13. The stator of claim 1, wherein the liner comprises at least two external fiber layers positioned so as to enclose the at least two resilient layers.

14. A positive displacement motor comprising:
   a stator comprising a shaped inner surface, (he inner surface comprising at least two radially inwardly projecting lobes extending helically along a selected length of the stator;
   a liner comprising at least two resilient layers and at least one fiber layer, the at least two resilient layers positioned so as to enclose the at least one fiber layer, the liner disposed within the stator so that the liner conforms to the helical shape formed by the at least two radially inwardly projecting lobes; and
   a rotor comprising at least one radially outwardly projecting lobe extending helically along a selected length of the rotor, wherein the rotor is disposed inside of the stator and the at least one radially outwardly projecting lobe formed on the rotor is adapted to sealingly engage the at least two radially inwardly projecting lobes formed when the liner conforms to the inner surface of the stator.

15. Tic positive displacement motor of claim 14, wherein the at last one fiber layer comprises a plurality of fibers wound at a selected angle with respect to a longitudinal axis of the stator tube.

16. The positive displacement motor of claim 14, wherein the at least one fiber layer comprises a plurality of fibers wound at a selected angle with respect to the at least two radially inwardly projecting lobes.

17. The positive displacement motor of claim 14, wherein the at least one fiber layer comprises aramid fibers.

18. The positive displacement motor of claim 14, wherein the at least one fiber layer comprises a plurality of fibers selected from the group consisting of glass fibers and carbon fibers.

19. The positive displacement motor of claim 14, wherein the at least one fiber layer comprises a woven fiber mesh.

20. The positive displacement motor of claim 14, wherein the at least one fiber layer comprises a plurality of fibers wound directly onto at least one of the at least two resilient layers.

21. The positive displacement motor of claim 14, wherein fibers forming the at least one fiber layer are braided.

22. The positive displacement motor of claim 14, wherein fibers forming the at last one fiber layer are woven.

23. The positive displacement motor of claim 14, wherein the liner comprises an adhesive disposed on an external surface thereof, the adhesive adapted to bond the liner to the inner surface of the stator.

24. The positive displacement motor of claim 14, wherein the at least one fiber layer is selectively positioned so as to form a substantially uniform fiber density throughout the liner.

25. The positive displacement motor of claim 14, wherein the liner comprises at least two external fiber layers positioned so as to enclose the at least two resilient layers.

26. A rotor for a positive displacement motor comprising at least one radially outwardly projecting lobe formed on an outer surface of the rotor, the at least one radially outwardly projecting lobe extending helically along a selected length of the rotor; and
   a liner comprising at least two resilient layers and at least one fiber layer, the at least two resilient layers positioned so as to enclose the at least one fiber layer, wherein the liner is disposed on the rotor proximate the outer surface, the liner conforming to the at least one radially outwardly projecting lobe and to die helical shape of the rotor.

27. The rotor of claim 26, wherein a thickness of the liner is at a maximum proximate the at least one radially outwardly projecting lobe.

28. The rotor of claim 26, wherein the at least one fiber layer comprises a plurality of fibers wound at a selected angle with respect to a longitudinal axis of the rotor.

29. The rotor of claim 26, wherein the at least one fiber layer comprises a plurality of fibers wound at a selected angle with respect to the at least one radially outwardly projecting lobe.

30. The rotor of claim 26, wherein the at least one fiber layer comprises aramid fibers.

31. The rotor of claim 26, wherein the at least one fiber layer comprises a plurality of fibers selected from the group consisting of glass fibers and carbon fibers.

32. Tho rotor of claim 26, wherein the at least one fiber layer comprises a woven fiber mcsh.

33. The rotor of claim 26, wherein the at least one fiber layer comprises a plurality of fibers wound directly onto at least one of the at least two resilient layers.

34. The rotor of claim 26, wherein fibers forming the at least one fiber layer arc braided.

35. The rotor of claim 26, wherein fibers forming the at least one fiber layer are woven.

36. The rotor of claim 26, wherein the liner comprises an adhesive disposed on an inner surface thereof, the adhesive adapted to bond the liner to the outer surface of the rotor.

37. The rotor of claim 26, wherein the at least one fiber layer is selectively positioned so as to form a substantially uniform fiber density throughout the liner.

38. The rotor of claim 26, wherein the liner comprises at least two external fiber layers positioned so as to enclose the at least two resilient layers.

39. A positive displacement motor comprising:
 a stator comprising a shaped inner surface, the inner surface comprising at least two radially inwardly projecting lobes extending helically along a selected length of the stator;
 a rotor comprising at least one radially outwardly projecting lobe formed on an outer surface of the rotor, the at least one radially outwardly projecting lobe extending helically along a selected length of the rotor; and
 a liner comprising at least two resilient layers and at least one fiber layer, the at least two resilient layers positioned so as to enclose the at least one fiber layer, the liner disposed on the external surface so that the liner conforms to the helical shape formed by the at least one radially outwardly projecting lobe,
 wherein the rotor is disposed inside of the stator and tie at least one radially outwardly projecting lobe formed when the liner conforms to the outer surface of the rotor is adapted to sealingly engage the at least two radially inwardly projecting lobes formed on the stator.

40. The positive displacement motor of claim 39, wherein the at least one fiber layer comprises a plurality of fibers wound at a selected angle with respect to a longitudinal axis of the rotor.

41. The positive displacement motor of claim 39, wherein the at least one fiber layer comprises a plurality of fibers wound at a selected angle with respect to the at least one radially outwardly projecting lobe.

42. The positive displacement motor of claim 39, wherein the at least one fiber layer comprises aramid fibers.

43. The positive displacement motor of claim 39, wherein the at least one Fiber layer comprises a plurality of fibers selected from the group consisting of glass fibers and carbon fibers.

44. The positive displacement motor of claim 39, wherein the at least one fiber layer comprises a woven fiber mesh.

45. The positive displacement motor of claims 39, wherein the at least one fiber layer comprises a plurality of fibers wound directly onto at least one of the at least two resilient layers.

46. The positive displacement motor of claim 39, wherein fibers forming the at least one fiber layer arc braided.

47. The positive displacement motor of claim 39, wherein fibers forming the at least one fiber layer are woven.

48. The positive displacement motor of claim 39, wherein the liner comprises an adhesive disposed on an inner surface thereof, the adhesive adapted to bond the liner,to the outer surface of the rotor.

49. The positive displacement motor of claim 39, wherein the at least one fiber layer is selectively positioned so as to form a substantially uniform fiber density throughout the liner.

50. The positive displacement motor or claim 39, wherein the liner comprises at least two external fiber layers positioned so as Lo enclose the at least two resilient layers.

* * * * *